Figure 1:
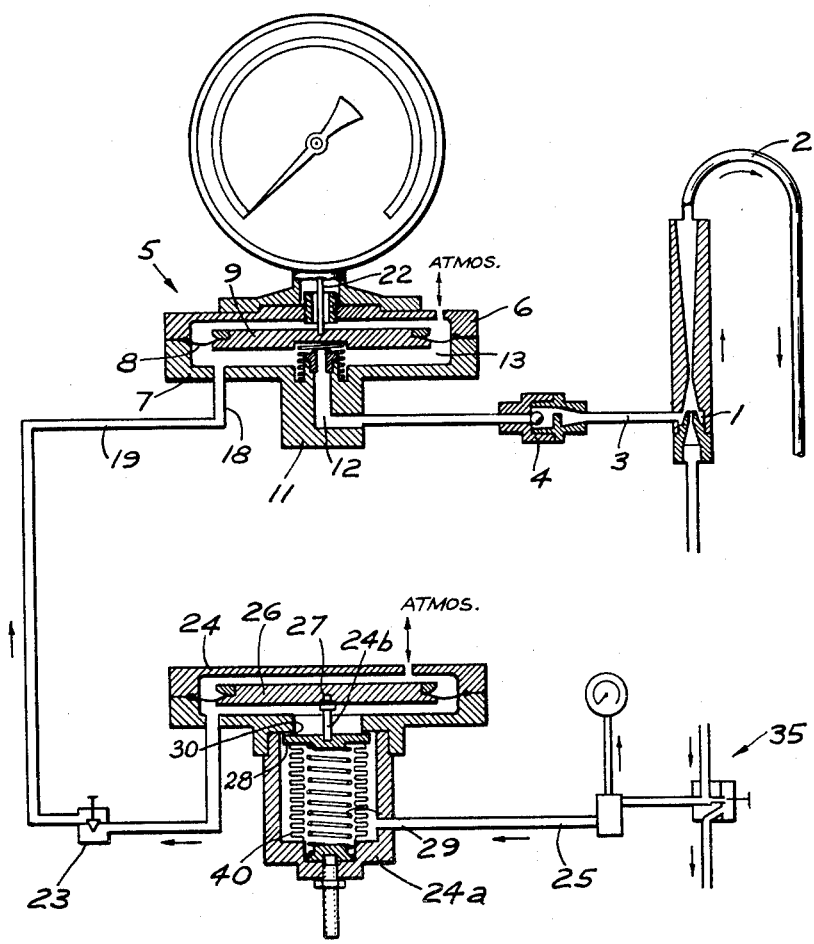

United States Patent Office

3,140,726
Patented July 14, 1964

1

3,140,726
MEASURING DEVICE FOR MEASURING
A FLUID FLOW
Karl-Heinz Arenhold, Karlsruhe-Durlach, Germany, assignor to Chlorator G.m.b.H., Grotzingen, Karlsruhe, Germany, a company of Germany
Filed Aug. 18, 1960, Ser. No. 50,397
Claims priority, application Germany Oct. 23, 1959
17 Claims. (Cl. 137—557)

The present invention relates to a device for feeding a treatment fluid at a metered rate of flow to a liquid to be treated, and more particularly to a device for measuring the rate of flow of gaseous chlorine fed to a flow of water for sterilizing the latter.

There are known and have been in use for many years chlorinating installations of the general kind above referred to, in which the chlorine conducting components of the installation are maintained at sub-atmospheric pressure for the purpose of preventing the escape of chlorine into the atmosphere in the event of any leak in the installation. Chlorine gas is toxic and has an obnoxious odor so that the escape of such gas is highly undesirable.

In chlorinating installations of the kind above referred to, the vacuum in the system is generally generated by the suction of an injector operated by a constant water flow. The injector sucks the chlorine from a supply of chlorine such as pressurized bottled chlorine through a vacuum reduction valve assembly. The reduction valve assembly, which may comprise a float controlled valve with a water seal or a spring loaded diaphragm valve, reduces the elevated pressure of the chlorine supply to sub-atmospheric pressure, thus preventing the escape of chlorine from the installation in the event of a defect. In installations as herein referred to, a regulating valve is frequently interposed between the injector and the vacuum reduction valve. The flow of chlorine sucked on by the injector is set for the maximum load of the installation when the regulating valve is fully open and can be throttled down to the desired flow rate. It is further customary to provide in the suction conduit of the injector a safety valve limiting the height of the vacuum prevailing in the installation to a certain predetermined value to protect the rather delicate components of the vacuum reduction valve assembly against damage by an excessive vacuum and also to permit operation of measuring instruments for measuring the added chlorine at constant pressure.

In chlorinating installations of the general kind above referred to, it is highly desirable to measure the fed chlorine for the entire range from maximum addition to minimum addition of chlorine. None of the chlorine measuring instruments developed for the aforementioned purpose as heretofore known, have been found entirely satisfactory.

Accordingly, it is the broad object of the present invention to provide a novel and improved measuring instrument capable of measuring the feed of a treatment fluid such as chlorine to a fluid flow to be treated for the entire operational range of such feed of treatment fluid.

A more specific object of the invention is to provide a novel and improved measuring instrument capable of measuring with equal accuracy the entire range of addition of treatment fluid from maximum addition to minimum addition.

A still more specific object of the invention is to provide a novel and improved measuring instrument for measuring the addition of gaseous chlorine to a flow of water to be treated which is physically separated from the flow of chlorine. This affords the advantage that the measuring instrument is not exposed to the corrosive action of chlorine and also protected from any impurities that may be present in the installation.

2

A further specific object of the invention is to provide a novel and improved measuring instrument for measuring the rate of flow of chlorine which can be installed or disassembled without removing or interrupting any chlorine conduits or other parts of the installation.

A further specific object of the invention is to provide a novel and improved measuring instrument, the measuring range of which can be conveniently changed without sacrifice in the accuracy of the indication over the entire selected range of the instrument.

It is also an object of the invention to provide a novel and improved measuring instrument which is simple and reliable in manufacture and which can be installed either as part of the installation or physically remote therefrom.

Other and further objects, features and advantages of the invention will be pointed out hereinafter and set forth in the appended claims forming part of the application.

In the accompanying drawing a preferred embodiment of the invention is shown by way of illustration and not by way of limitation.

Figure 2:
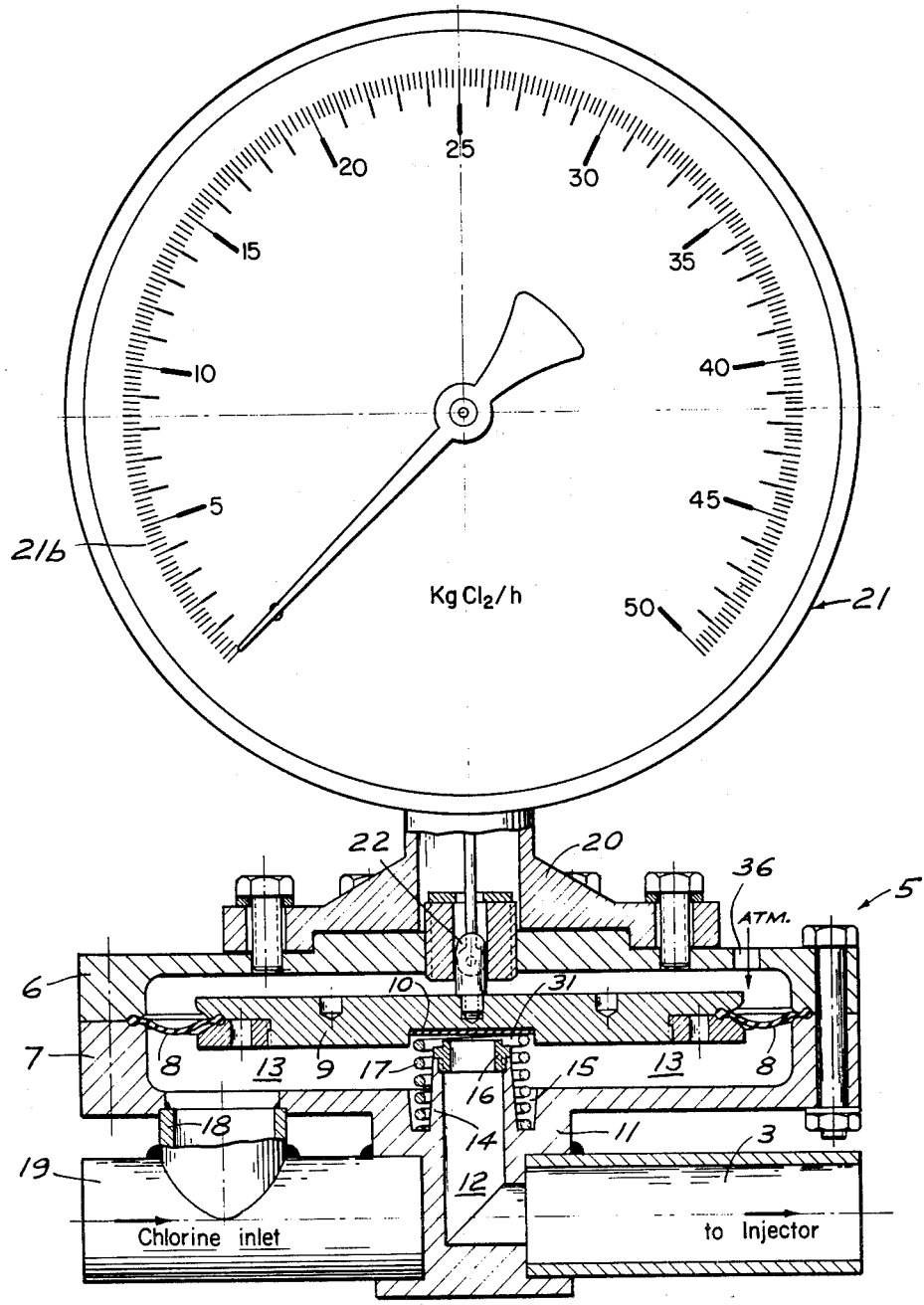

In the drawing:

FIG. 1 is a diagram of a chlorinating installation equipped with a measuring instrument according to the invention, and FIG. 2 is a cross sectional, elevational view of a measuring instrument on an enlarged scale.

Referring now to the figures in detail, the installation, according to FIG. 1, comprises a conduit 2 for the fluid flow to be treated. Conduit 2 may be visualized as a conduit for water branched off from a water main and returned into the same after being treated with chlorine in gaseous form. An injector 1 shown as an injector of the venturi type, is included in conduit 2. A suction pipe 3 is connected to the throat of the injector and connects the injector through a measuring instrument 5 and a pipe 19 to the outlet side of a vacuum reduction assembly 24. The inlet side of the reduction valve assembly is connected by a pipe 25 to a chlorine supply line 35 which should be visualized as being connected to a suitable supply of chlorine such as chlorine maintained under pressure in a bottle (not shown). Measuring instrument 5 serves to measure the rate of chlorine supplied through suction pipe 3 into conduit 2. A safety valve 4, which may be visualized as a one-way valve, is also included in pipe 3 between injector 1 and instrument 5 and serves to prevent the ingress of water into the suction system. Pipe 19 includes a regulating valve 23 interposed between measuring instrument 5 and reduction valve assembly 24 for the purpose of regulating the vacuum generated in pipe 3 by the action of injector 1 and thus effective in the entire installation.

Referring now to FIG. 2 the instrument according to this figure comprises a housing composed of a top part 6 and a bottom part 7. A diaphragm ring 8 is peripherally held between the two parts of the housing and, in turn, supports a rigid disc 9 thus dividing the housing in two compartments. The upper compartment communicates with the atmosphere through a vent 36. The bottom part 7 of the housing mounts a connector stud 11 which has a central bore 12 to which is connected the portion of suction pipe 3 leading to injector 1 thereby connecting the injector and the lower housing compartment 13. Compartment 13 is further connected by means of a connector stud 18 to pipe 19, leading to reduction valve assembly 24. As is evident, the vacuum generated in pipe 3 will suck chlorine through pipe 19 and compartment 13 into pipe 3 and finally into conduit 2. The connection between pipes 3 and 19 is controlled by a valve within compartment 13. The valve is formed by a sleeve-shaped extension 14 of connector 11 and nozzle 16 resting upon the upper rim of extension 14 and co-acting with a valve plate 10 fitted in a circular recess of disc 19. The extension 14 and nozzle 16 are surrounded by a loaded coiled compression spring 17 which is fitted on one end in an annular recess 15 formed in connector 11 and abuts with its other end against valve plate 10. Spring 17 urges disc 9, which is flexibly supported by a diaphragm ring 8, upwardly in reference to the upper rim of nozzle 16 to open a ring shaped valve slot 31 between valve plate 10 and the nozzle. As is apparent, valve slot 31 opens a communication between pipes 3 and 19 and the axial width of slot 31 controls the possible flow of chlorine from pipe 19 into pipe 3.

The rate of the chlorine flow is further controlled by the flow cross section of nozzle 16. This nozzle is exchangeably mounted so that by selecting a smaller or larger nozzle the flow of chlorine for a given width of slot 31 can be conveniently varied.

As is evident, the deflection of diaphragm ring 8, and with it the axial position of rigid disc 9 in reference to nozzle 16, are controlled by the pressure differential between the upper and the lower compartment in the housing of instrument 5 which, in turn, is controlled by the pressure in compartment 13 and thus the flow of chlorine through the compartment. Accordingly, the linear up and down movements of disc 9 which is displaced parallel to its own plane, are indicative of the flow of chlorine from pipe 19 into pipe 3 and this linear up and down movement is used according to the invention to indicate the rate of flow of chlorine flowing into conduit 2. For this purpose a feeler pin 22 of an indicator 21 engages the upper side of disc 19, that is the side thereof which is not in contact with the flow of chlorine through the instrument. Pin 22 is longitudinally displaceable in unison with the displacements of disc 9 and is guided for this purpose by a flange 20 mounted on upper housing part 6. The increments of the movement of pin 22 are translated into corresponding rotary movements of a pointer 21a of the indicator. The pointer moves along a scale 21b calibrated in units of the consumption of chlorine or other treatment fluid to be measured, for instance in kilograms of chlorine per hour. The conversion of the linear movements of pin 22 into the rotary movements of pointer 21a can be effected in any suitable manner, for instance, by providing transmission means in the form of a gear train or a linkage system. Indicators of this kind are well known in the art and readily available in the market. The specific structure of the indicator does not constitute part of the invention and hence a detailed description thereof is not believed to be necessary for the understanding of the invention. As is apparent from the previous description, the essential concept of the invention resides in the utilization of the axial displacement of disc 9. The increments of such displacement for each unit of chlorine consumption are the same for the entire range. Accordingly, scale 21b can be uniformly calibrated for the entire range, thus affording uniform accuracy of reading for the full range, instead of the heretofore necessary condensation of the scale at the lower values and attendant reduction in reading accuracy. The scale as shown is calibrated for an installation operating within a range between 0–50 kg./h. In the event the installation is intended to be used, for instance, for a maximum load of 5 kg./h, this can be readily effected by exchanging nozzle 16 and calibrating the scale for a range between 0–5 kg. Again the reading accuracy will be the same over the entire range.

The vacuum reduction assembly 24 is more fully described in my copending application, Serial No. 39,358, filed June 28, 1960, now abandoned. It suffices to state for the purpose of the present invention that the valve assembly comprises a housing divided by a diaphragm 26 in an upper compartment and a lower compartment. The upper compartment is open to the atmosphere and the lower compartment is connected through regulating valve 23 to pipe 19 and the chlorine supply pipe 25. The latter connection is under the control of a valve formed by a valve disc 28 co-acting with a valve seat 30 defining a valve opening leading into a lower compartment 24a of the housing of valve assembly 24. The chlorine feed pipe 25 is connected to this housing portion which also accommodates a bellows 40 extending between valve disc 28 and the base of housing portion 24a. A loaded coiled spring 29 within the bellows seeks to press valve disc 28 into the valve closing position. The pressure which the chlorine freely flowing into housing portion 24a exerts upon disc 28 in the closing direction thereof is counterbalanced by the lateral pressure which the chlorine exerts upon the wall of the bellows and which tends to move the valve disc into the open position. As a result, the only effective pressure which acts upon disc 28 in the closing direction thereof is the pressure exerted by spring 29. This affords the advantage that the opening and closing of valve 28, 30 is independent of the pressure of the chlorine which tends to decrease as the supply of chlorine is being depleted during operation.

The opening of valve disc 28 against the action of spring 29 is controlled by the deflection of diaphragm 26 by means of a rigid pin 24b depending from diaphragm 26 and abutting against disc 28 on the side thereof opposite to spring 29. The deflection of diaphragm 26 is controlled by the pressure differential between the upper and the lower compartment of the housing of valve assembly 24. This pressure differential in turn is controlled by the vacuum prevailing in pipe 19. The vacuum reduction valve assembly is so adjusted that chlorine will be fed through valve 28, 30 into pipe 19 only when a certain height of the vacuum has been reached and the feed of chlorine is cut off when the vacuum becomes lower than the predetermined value. In actual practice the valve assembly will adjust itself to a condition of equilibrium as to the opening between disc 28 and the valve seat 30 so that a uniform flow of chlorine is effected.

The operation of the installation as hereinbefore described and especially of the measuring instrument thereof, is as follows:

The vacuum created by injector 1 in suction pipe 3 extends through valve slot 31 in instrument 5, pipe 19 and regulating valve 23 to the vacuum reduction valve assembly 24 in which pressure differential between the upper compartment connected to the atmosphere and the lower compartment under partial vacuum causes a corresponding opening between valve seat 30 and valve disc 28 permitting the flow of chlorine into pipe 19. Depending upon the suction force of the injector and the setting of valve 23, valve assembly 24 will be in equilibrium at a certain definite flow of chlorine. This flow of chlorine and the partial vacuum in pipe 3 will cause a definite deflection of disc 9 for each rate of flow of chlorine in response to the pressure differential between the upper and lower chamber of instrument 5. As a result pointer 21a of indicator 21 will occupy a corresponding position. If valve 23 is adjusted, say to reduce the rate of the sucked-on chlorine, the position of disc 9 is correspondingly changed, to wit, it will be forced further downward, thus reducing the width of valve slot 31. Pointer 21a will follow the movement of disc 9. Accordingly, there is a fixed position of disc 9 for each rate of flow and an equally fixed position of pointer 21a.

As has been pointed out before, nozzles 16 of different caliber may be used. The more the flow of chlorine is reduced by means of valve 23, the smaller is the caliber of the nozzle that is used. This makes it possible to utilize the full potential stroke of disc 9 even in installations designed for the feed of a small volume of chlorine, which affords the advantage that slight changes in the rate of feed can be accurately read on the scale throughout the entire range thereof. To state it differently, the measuring instrument of the invention permits, by suitable selection of the nozzle caliber, adjustment of the instrument for maximum reading accuracy irrespective of whether the maximum load is a few grams or many kilograms per hour. All that is necessary is to change the nozzle and the calibration of the scale of the indicator. As has been pointed out before, each rate of feed of chlorine and the position occupied by the diaphragm assembly 8, 9 are in a definite relationship.

Spring 17 pressing against disc 9 from the chlorine side thereof is always in equilibrium with the vacuum controlling the feed of chlorine at valve assembly 24. In the event of disturbances, for instance, if the chlorine feed line 25 becomes clogged, the vacuum continuously generated by injector 1 is not continuously compensated by the influx of fresh chlorine. As a result, the suction power of the injector may build up a dangerously high vacuum. To avoid such danger, spring 17 is so laid out that the tendency of the diaphragm assembly 8, 9 to move disc 9 into the position closing valve slot 31 in response to a vacuum higher than a predetermined value is stronger than the oppositely acting force of spring 17. Engagement of valve plate 10 with the upper rim of nozzle 16 will close slot 31 completely, thus stopping the flow of chlorine toward the injector. Feeler pin 22 follows disc 9 into the lowermost position thereof and, accordingly, pointer 21a will correctly show a zero flow. Only after the flow of chlorine through the feed line 25 has been restored, the action of spring 17 is again sufficient to re-open valve slot 31 and the indicator will again indicate the rate of flow of chlorine.

The indicator is not necessarily directly associated with the diaphragm assembly 8 and 9 of instrument 5. If a device for holding the pressure constant is provided ahead of valve assembly 24 so that the pressure differential between the two sides of disc 28 of valve assembly 24, that is between the chlorine side and the vacuum side thereof always remain equal, and if further spring 29 is arranged as a measuring spring, then diaphragm 26 will occupy for each setting of valve 23 a definite position which can be utilized to indicate the linear displacements of diaphragm 26 by means of an indicator such as indicator 21.

As is further evident, the device 5 can be connected to a repeat indicator located remote from the illustrated installation and the instrument can also be equipped with maximum and minimum contacts which may be used to initiate suitable control operations if actuated.

While the invention has been described in detail with respect to a certain now preferred example and embodiment of the invention is will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. In an installation in which treatment fluid is fed from a supply of treatment fluid to a fluid flow to be treated through a feed conduit maintained at a sub-atmospheric pressure by a suction means, a closed housing, one wall of said housing being formed by a diaphragm deflected in response to a pressure differential between the pressure within the housing and the ambient atmosphere, said housing being interposed between feed conduit portions leading to said treatment fluid supply and said suction means respectively thereby subjecting the said housing to the pressure condition in the feed conduit, valve means within said housing controlled by the deflection of said diaphragm in response to said pressure differential and controlling the rate of flow of treatment fluid through said housing and feed conduit, and indicating means drivingly coupled with the middle of said diaphragm on the side thereof exposed to the atmosphere to detect and indicate deflections thereof, said deflections being indicative of the rate of flow of treatment fluid through said feed conduit.

2. An installation according to claim 1 wherein said indicating means includes a detecting member engaging said diaphragm for movement in unison therewith, said detecting member being linearly displaceable in accordance with the deflections of said diaphragm.

3. An installation according to claim 1 wherein said indicating means is disposed on the outside of said housing and in engagement with the side of said diaphragm exposed to the atmosphere.

4. An installation according to claim 1 wherein said indicating means comprises a scale linearly calibrated in the rate of flow of the treatment fluid.

5. An installation according to claim 1 wherein said valve means within the housing comprises a valve member defining a valve opening communicating with one of the feed conduit portions connected to the housing, the other feed conduit portion connected to the housing issuing directly into the same, said diaphragm constituting a valve control member which controls the effective flow path through said valve opening in accordance with the deflections of said diaphragm in response to said pressure differential.

6. An installation according to claim 5 wherein the feed conduit portion leading to said suction means communicates with said valve opening, the feed conduit portion leading to the treatment fluid supply issuing directly into the housing.

7. An installation according to claim 5 wherein said valve member is in the form of a cylindrical nozzle, said diaphragm being disposed in a general plane perpendicular to the axis of said nozzle to define a ring-shaped flow path through said nozzle, the axial width of said ring-shaped flow path being controlled by the deflections of said diaphragm.

8. An installation according to claim 7 wherein said nozzle is detachably mounted to permit use of nozzles of different caliber.

9. An installation according to claim 1 wherein said valve means within the housing comprises a valve member defining a valve opening communicating with one of the feed conduit portions connected to the housing, the other feed conduit portion connected to the housing issuing directly into the same, said diaphragm constituting a valve control member which controls the effective flow path through said valve opening in accordance with the deflections of said diaphragm in response to said pressure differential, and loaded spring means within the housing co-acting with said diaphragm to urge the same towards the maximum flow path.

10. In an installation in which a treatment fluid is fed from a supply of treatment fluid to a fluid flow to be treated through a feed conduit maintained at a sub-atmospheric pressure by a suction means, said measuring device comprising a casing, a diaphragm mounted within said casing to divide the same in two compartments, one of said compartments being closed and interposed between feed conduit portions leading to the supply of treatment fluid and the suction means, respectively, to subject said compartment to the pressure conditions in the feed conduit, the other compartment being open to the atmosphere, said diaphragm being deflected in accordance with the pressure differential between said two compartments, valve means within said one compartment controlled by the deflections of said diaphragm and controlling the rate of flow of treatment fluid through said one compartment, and indicating means drivingly coupled with the middle of said diaphragm on the side thereof exposed to the atmosphere to detect and indicate deflections thereof, said deflections being indicative of the rate of flow of treatment fluid through said one compartment.

11. An installation according to claim 10 wherein said indicating means includes a detecting member in engagement with said diaphragm on the side thereof exposed to the atmosphere, said detecting member being linearly displaceable in accordance with the deflections of the diaphragm.

12. An installation according to claim 10 wherein said indicating means comprises a scale linearly calibrated in rates of flow of said treatment fluid.

13. An installation according to claim 10 wherein said valve means within said one compartment comprises a valve member defining a valve opening communicating with one of the feed conduit portions connected to said one compartment, the other feed conduit portion connected to said one compartment issuing directly into the same, said diaphragm constituting a valve control member which controls the effective flow path through said valve opening in accordance with the deflections of said diaphragm.

14. An installation according to claim 13 wherein the feed conduit portion leading to the suction means communicates with said valve opening, the feed conduit portion leading to the treatment fluid supply issuing directly into said one compartment.

15. An installation according to claim 13 wherein said valve member is in the form of a cylindrical nozzle, said diaphragm being disposed in a general plane perpendicular to the axis of said nozzle to define a ring-shaped flow path through said nozzle, the axial width of said flow path being controlled by the deflections of said diaphragm.

16. An installation according to claim 15 wherein said nozzle is detachably mounted to permit use of nozzles with different caliber.

17. An installation according to claim 10 wherein said valve means within said one compartment comprises a valve member defining a valve opening communicating with one of the feed conduit portions connected to said one compartment, the other feed conduit portion connected to said one compartment issuing directly into the same, said diaphragm constituting a valve control member which controls the effective flow path through said valve opening in accordance with the deflections of said diaphragm, and loaded spring means within said one compartment co-acting with said diaphragm to urge the same toward the position of a maximum flow path.

References Cited in the file of this patent
UNITED STATES PATENTS

| | | |
|---|---|---|
| 1,054,023 | Niedecken | Feb. 25, 1913 |
| 1,173,038 | Roschanek | Feb. 22, 1916 |
| 2,957,494 | Stenberg | Oct. 25, 1960 |